United States Patent
Dowdy

[19]

[11] Patent Number: 5,955,039
[45] Date of Patent: *Sep. 21, 1999

[54] COAL GASIFICATION AND HYDROGEN PRODUCTION SYSTEM AND METHOD

[75] Inventor: Thomas Elwood Dowdy, Orlando, Fla.

[73] Assignee: Siemens Westinghouse Power Corporation, Orlando, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,702

[22] Filed: Dec. 19, 1996

[51] Int. Cl.⁶ .................................. B01J 8/00; C01B 3/02; C10J 3/00

[52] U.S. Cl. .......................... 422/189; 422/168; 422/170; 422/198; 48/77; 48/202; 48/210; 48/DIG. 5; 60/39.12; 60/39.52; 429/30

[58] Field of Search .............................. 423/210, 242.1, 423/648.1, 650; 429/30; 431/253; 60/39.02, 39.12, 39.52; 48/202, 210, DIG. 5; 422/189, 190, 198, 199, 173, 168–171

[56] References Cited

U.S. PATENT DOCUMENTS

| | | | |
|---|---|---|---|
| 4,098,960 | 7/1978 | Gagnon | 429/25 |
| 4,202,167 | 5/1980 | Suggitt et al. | 60/39.02 |
| 4,312,638 | 1/1982 | Koump | 48/197 R |
| 4,490,444 | 12/1984 | Isenberg | 429/31 |
| 4,539,918 | 9/1985 | Beer et al. | 110/266 |
| 4,547,437 | 10/1985 | Isenberg et al. | 429/30 |
| 4,597,170 | 7/1986 | Isenberg | 29/623.5 |
| 4,677,829 | 7/1987 | Archer et al. | 60/39.02 |
| 4,728,584 | 3/1988 | Isenberg | 429/31 |
| 4,845,940 | 7/1989 | Beer | 60/732 |
| 4,936,869 | 6/1990 | Minderman et al. | 48/77 |
| 5,117,623 | 6/1992 | Arundale | 60/39.05 |
| 5,139,541 | 8/1992 | Edlund | 55/16 |
| 5,217,506 | 6/1993 | Edlund et al. | 55/16 |
| 5,259,870 | 11/1993 | Edlund | 95/56 |
| 5,393,325 | 2/1995 | Edlund | 95/56 |
| 5,401,589 | 3/1995 | Palmer et al. | 429/13 |
| 5,413,879 | 5/1995 | Domeracki et al. | 429/30 |
| 5,451,386 | 9/1995 | Collins et al. | 423/237 |
| 5,498,278 | 3/1996 | Edlund | 96/111 |
| 5,540,896 | 7/1996 | Newby | 422/172 |

FOREIGN PATENT DOCUMENTS

| | | | |
|---|---|---|---|
| 0 009 524 | 4/1980 | European Pat. Off. | C01B 3/36 |
| 770 576 | 5/1997 | European Pat. Off. | C01B 3/36 |
| 2 296 255 | 6/1996 | United Kingdom | C10J 3/46 |
| WO 96 39369 | 12/1996 | WIPO | C07C 27/00 |

OTHER PUBLICATIONS

Database WPI Section CH, Week 9647 Derwent Publications Ltd., London GB Class E36, an 96–475277.

Patent Abstracts of Japan vol. 097, No. 004, Apr. 30, 1997 & JP 08 338260 A (Tokyo Gas Co Ltd; Mitsubishi Heavy Ind Ltd) Dec. 24, 1996.

Reigel "Industrial Chemistry", 5th Edition, Published by Reinhold Publishing Corp., 430 Park Ave, New York NY p. 298, No Month 1949.

(List continued on next page.)

Primary Examiner—Hien Tran

[57] ABSTRACT

A system and method generates electricity and co-produces a hydrogen flow from coal. The electricity is generated by a turbine with a topping combustor and a solid oxide fuel cell ("SOFC") reacting syngas. The syngas is produced in a coal gasifier with a portion of the compressed air from the turbine, coal, and steam. Prior to the syngas being delivered to the topping combustor and the SOFC, it is cleaned and a portion of the hydrogen in the syngas is removed to form the hydrogen flow. Additionally, a vitiated air flow from the SOFC is directed to the topping combustor and another portion of the compressed air from the turbine directed to the SOFC after it is heated with the turbine exhaust. An aspect of the invention varies the amount of electricity generated and the volume of hydrogen co-produced based upon the demand of electricity and/or the demand of said hydrogen.

8 Claims, 2 Drawing Sheets

OTHER PUBLICATIONS

McDaniel, H.M. et al., "Advanced Metal–Membrane Technology–Commercialization and Separation of Hydrogen. . ." Proceedings of the Advanced Coal–Fired Power Systems '95 Review Meeting, *U.S. Department of Energy,* Jun. 1995, vol. II, 645–654. Morgantown W.V. USA.

Newby, R. et al., "Combustion Turbine Performance in Coal Gasification Combined Cycles", Westinghouse Electric Corporation, 11 pgs. Presented at the International Gas Turbine and Aeroengine Congress and Exhibition; Birmingham UK, Jun. 10–13, 1996.

Bevc, F.P. et al., "Surecell# Integrated Solid Oxide Fuel Cell Power Plants for Distributed Power Applications", Westinghouse Electric Corporation, Dec. 5–7, 1995, 1–18. Powergen 1995–Americas California USA.

Houken, J. et al., "3rd Chiyoda Symposium on Topsøe Steam Reforming Steam Reforming of Heavy Hydrocarbons", May 1981, 16 pgs.

Tottrup, P.B. et al., "Higher Hydrocarbon Reforming", Syngas Production Generation, Mar. 1982, 3 pgs *Hydrocarbon Processing* .

Rostrup–Nielsen, J.R. et al., "Steam Reforming of Heavy Feedstocks", Symposium on Science of Catalysis and Its Application in Industry, Feb. 22–24, 1979, Paper No. 39, 380–399.

Vannby, R. et al., "Operating Experience in Advanced Steam Reforming", Symposium on Large Chemical Plants, Oct. 12–14, 1992, 10 pgs. Antwerp, Belgium.

Dybkjoer, I., "Steam Reforming Technology", Technical Symposium at the 4th Int'l Chem. Pant Exhibition, Apr. 26–30, 1994, 1–24. Seoul Korea.

Lippert, T.E. et al., "The Status of Westinghouse Hot Gas Particle Filters and Testing Results", Westinghouse Electric Corporation, Dec. 5–7, 1995, 1–16. Presented at Power–Gen Americas '95 Anaheim, California USA.

4,955,039

COAL GASIFICATION AND HYDROGEN PRODUCTION SYSTEM AND METHOD

BACKGROUND OF THE INVENTION

1. Field of the Invention

The present invention relates to the field of generating electricity. More specifically, the present invention relates to the field of generating electricity and hydrogen with coal.

2. Description of the Related Art

The related art discloses electricity generating systems that produce syngas from coal and generate electricity from the syngas using a turbine and a solid oxide fuel cell. Under the appropriate conditions, these systems produce very low emissions of sulfur oxides ("SOx"), nitrogen oxides ("NOx"), alkalies, and particulates. The related art also discloses generating electricity from nuclear power which has clean emissions, but comes with the concerns of producing the nuclear power source and generating nuclear waste.

With both of the coal and nuclear sources of electricity, the cost per kilowatt hour is cheapest when the generating systems are operating at full capacity. However, the demand for electricity typically fluctuates in the course of a day, which leads to inefficient production of electricity during off-peak demand hours. The related art describes other processes integrated with the electrical generation plants to co-produce another product such that excess electrical generation capacity during off-peak demand hours is used in the co-production process.

The related art describes a nuclear power plant operating at full capacity by co-producing hydrogen. The nuclear power plant is integrated with an electrolysis plant that generates hydrogen from water by electrolysis. The integrated nuclear power plant/electrolysis plant system produces electricity on demand while it co-produces hydrogen using the nuclear power plant's excess capacity during off-peak demand hours. This results in a minimized cost of electricity and hydrogen.

Hydrogen is a beneficial co-product for its uses in a hydrogen-based economy, which uses hydrogen as a fuel, a chemical feedstock, and for other purposes. Hydrogen as a fuel is attractive because the combustion of hydrogen with oxygen to produce electricity and other sources of power has non-polluting water as an emission. The prospect of generating electricity without creating polluting emissions without nuclear energy is in itself is an incentive to grow the hydrogen-based economy. Hydrogen is also useful in other processes, such as a chemical feedstock in fertilizer production or in the production of metal hydrides, which is a source of fuel that does not have the storage concerns of liquid or gaseous hydrogen.

Therefore, a need exists for using coal to generate electricity and co-produce hydrogen in an economically viable process with low emissions of pollutants.

SUMMARY OF THE INVENTION

It is an object of the present invention to provide a system and method for generating electricity and co-producing a hydrogen flow from coal. The electricity is generated by a turbine with a topping combustor and a solid oxide fuel cell ("SOFC") reacting syngas. The syngas is produced in a coal gasifier with a portion of the compressed air from the turbine, coal, and steam. Prior to the syngas being delivered to the topping combustor and the SOFC, it is cleaned and a portion of the hydrogen in the syngas is removed to form the hydrogen flow. Additionally, the vitiated air flow from the SOFC is directed to the topping combustor and another portion of the compressed air from the turbine directed to the SOFC after it is heated with the turbine exhaust.

It is another object of the invention to efficiently use the components of thereof by varying the amount of electricity generated and the volume of hydrogen co-produced based upon the demand of electricity and/or the demand of said hydrogen.

DETAILED DESCRIPTION OF THE PREFERRED EMBODIMENT(S)

Figure 1:
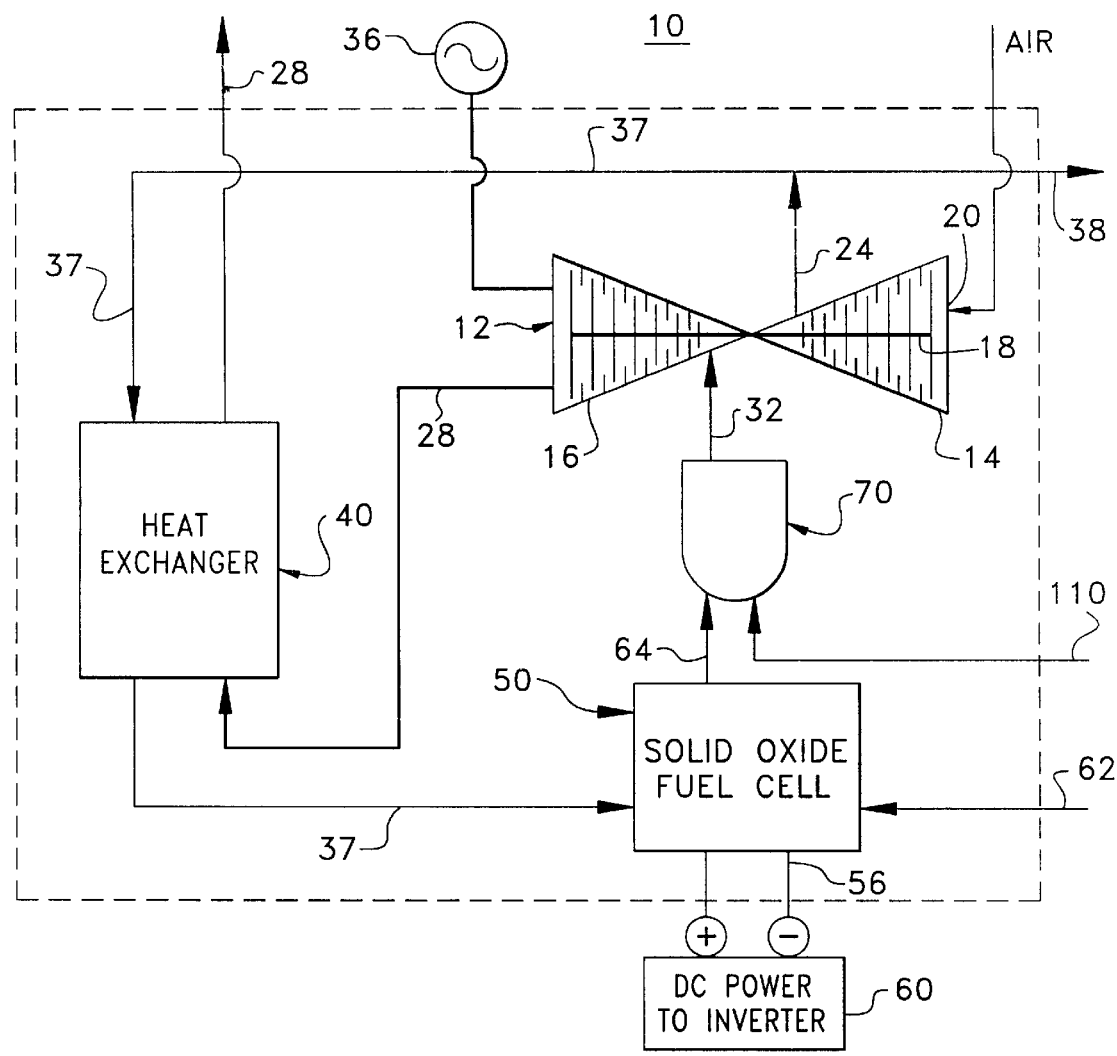
FIG. 1 is a schematic diagram of a turbine/solid oxide fuel cell system of the present invention that generates electricity and provides compressed air for a coal gasification process in a syngas/hydrogen co-production system.

Referring now to the figures in which like reference numerals refer to like elements, and referring specifically to FIG. 1, a turbine/solid oxide fuel cell system 10 of the invention comprises a turbine 12, a counter-flow heat exchanger 40, a solid oxide fuel cell ["SOFC"] 50, and a topping combustor 70. The turbine 12 has a compressor 14, an expander 16, and a rotor 18 extending therethrough. In the preferred embodiment, the turbine 12 is commercially available from Westinghouse Electric Corp., 11 Stanwix St., Pittsburgh, Pa. 15222 as a 501G Class Turbine. Other embodiments of the invention may use other suitable turbines. The compressor 14 inducts feed air at feed air inlet 20 and produces a compressed air flow 24. In the preferred embodiment, the compressed air flow 24 is approximately 19–20 atm and approximately 700F. Compressed air flow 24 exits compressor 14 and is divided into compressed air flow 37 and compressed air flow 38. The compressed air flow 37 is directed to the counter-flow heat exchanger 40, while the compressed air flow 38 is directed to a coal gasifier 152 (see FIG. 3). An embodiment of the invention may have additional portions of the compressed air flow 24 diverted to the expander and other components of the system 10 for cooling or other purposes.

The expander 16 of turbine 12 receives a combustion products flow 32 from the topping combustor 70 and travels therethrough, which causes the rotor 18 to rotate. The rotating rotor 18 compresses the feed air in compressor 14 to produce the compressed air flow 24 and generates power in a generator 36 attached to the turbine 12. After traveling through the expander 16, the combustion products flow exits the expander as exhaust air flow 28. In the preferred embodiment, the exhaust air flow 28 is approximately 1 atm and 1100F. The exhaust air flow 28 is then directed to the counter-flow heat exchanger 40.

The counter-flow heat exchanger 40 receives the compressed air flow 37 and heats it to approximately 1000F. with the exhaust air flow 28. During this heat exchange, the exhaust air is cooled to approximately 800F. In the preferred embodiment of the invention, the heat exchanger 40 is a finned tube-type heat exchanger. Other embodiments of the invention may use other heating units, with or without having the heat provided by turbine exhaust air flow 28. After the exchange of thermal energy, the now cooler exhaust air flow 28 may be released to a stack or to another heat exchanger for further heat recovery (not shown).

After exiting the heat exchanger 40, the now hotter, compressed air flow 37 is directed into the SOFC 50. Suitable SOFCs 50 for the present invention are disclosed in U.S. Pat. No. 4,490,444 to Isenberg entitled "High Temperature Solid Electrolyte Fuel Cell Configurations and Interconnections," U.S. Pat. No. 4,547,437 to Isenberg et al. entitled "Protective Interlayer for High Temperature Solid Electrolyte Electrochemical Cells," U.S. Pat. No. 4,597,170 to Isenberg entitled "Method of Making an Electrode," U.S. Pat. No. 4,728,584 to Isenberg entitled "Fuel Cell Generator Containing Self-Supporting High Gas Flow Solid Oxide Electrolyte Fuel Cells," and U.S. Pat. No. 5,413,879 to Domeracki et al. entitled "Integrated Gas Turbine Solid Oxide Fuel Cell System," each of which is incorporated by reference herein in its entirety. The SOFC 50 also receives a low sulfur syngas flow 62, which is described below.

The SOFC 50 processes the compressed air flow 37 and the low sulfur syngas flow 62 to produce electricity and a vitiated air flow 64. The electricity is delivered to an inverter 60 via an inverter delivery means 56. The SOFC 50 does not consume 100% of the syngas in the low sulfur syngas flow 62, resulting in unreacted syngas. In the preferred embodiment, the vitiated air flow 64 contains the unreacted syngas and is approximately 18 atm, approximately 1500F. to 1800F., and approximately 12% to 14% oxygen. The vitiated air exits the SOFC 50 and is directed to the topping combustor 70.

The topping combustor 70 receives the vitiated air flow 64 from the SOFC 50 and receives a fuel stream 110. In the preferred embodiment of the invention, the fuel stream 110 is produced by a syngas/hydrogen co-production system 150, which also produces the syngas for the SOFC 50 while it co-produces hydrogen (see FIG. 3). The fuel stream 110 is combusted in the vitiated air stream 64 to produce combustion products at approximately 2650F. that are well over 99% free of particulates, have extremely low alkali's, less than 1 ppm SOx, and less than 10 ppm NOx. The combustion products flow 32 exits the topping combustor 70 and is received by the expander 16. Suitable topping combustors 70 are disclosed in U.S. Pat. No. 4,539,918 to Beer entitled "Multiannular Swirl Combustor Providing Particulate Separation," U.S. Pat. No. 4,845,940 to Beer entitled "Low NOx Rich-Lean Combustor Especially Useful In Gas Turbines," and in a commonly assigned, co-pending application filed on May 25, 1994, Ser. No. 08/248,742 of Bachovchin et al. Now U.S. Pat. No. 5,636,510 entitled "An Improved Gas Turbine Topping Combustor," each of which is incorporated by reference herein in its entirety.

Figure 2:
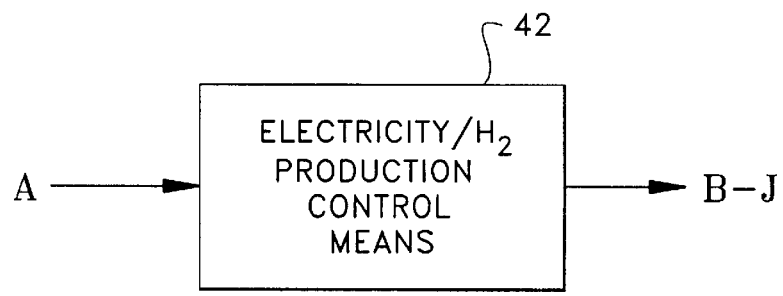
FIG. 2 is a schematic diagram of an electricity/hydrogen control means for determining and directing the generation of electricity and the co-production of hydrogen in an embodiment of the present invention.

Now referring to FIG. 2, in the preferred embodiment of the invention, an electricity/hydrogen production control means 42 beneficially directs different components of the invention to control the amount of electricity generated by the turbine/SOFC system 10 and the amount of hydrogen co-produced in the syngas/hydrogen co-production system 150 described below. The generation of electricity and the co-production of hydrogen by the preferred embodiment of the invention have an inverse relationship. In an embodiment of the invention, the electricity is generated to fulfill electrical demand while the hydrogen flow is co-produced as the electrical demand permits. In another embodiment of the invention, the hydrogen is co-produced on demand and the electricity is supplied as the hydrogen demand permits. In either embodiment, the turbine 12 can operate at full capacity during the course of the entire day, which assists in maximizing the economic benefits of the invention, by varying the production of electricity and hydrogen.

The economic benefits of the invention are further maximized by providing a source of hydrogen for hydrogen-consuming processes in a hydrogen-based economy, as discussed previously. The embodiment of the invention that supplies electricity on demand feeds the hydrogen to a process that economically tolerates the fluctuations of the hydrogen supply. For example, the hydrogen may be fed to a metal hydride production facility that operates at a higher capacity during off-peak electrical usage hours. Likewise, the embodiment of the invention that supplies hydrogen on demand feeds the electricity to a process that economically tolerates the fluctuations of the hydrogen supply. However, other embodiments of the invention may produce fixed amounts or fixed ratios of electricity and hydrogen, both of which still provide an economic benefit by producing hydrogen for hydrogen based economies.

The electricity/hydrogen control means 42 receives input A that contains information concerning the demands for electricity and hydrogen. In practice, the control means 42 is suitably a microprocessor-based control for receiving the unputted information, and providing control set-points based on the inputted information and other data stored in memory, in accordance with standard software. The control means 42 processes the input A information to calculate the most economical amounts of electricity and hydrogen to produce at any one time. The control means 42 then sends outputs B through J to various components in the syngas/hydrogen co-production system 150 to control the amount of electricity and hydrogen produced. Other embodiments of the invention may have the outputs going to components in the turbine/SOFC system 10 as well as components outside of the two systems.

Figure 3:
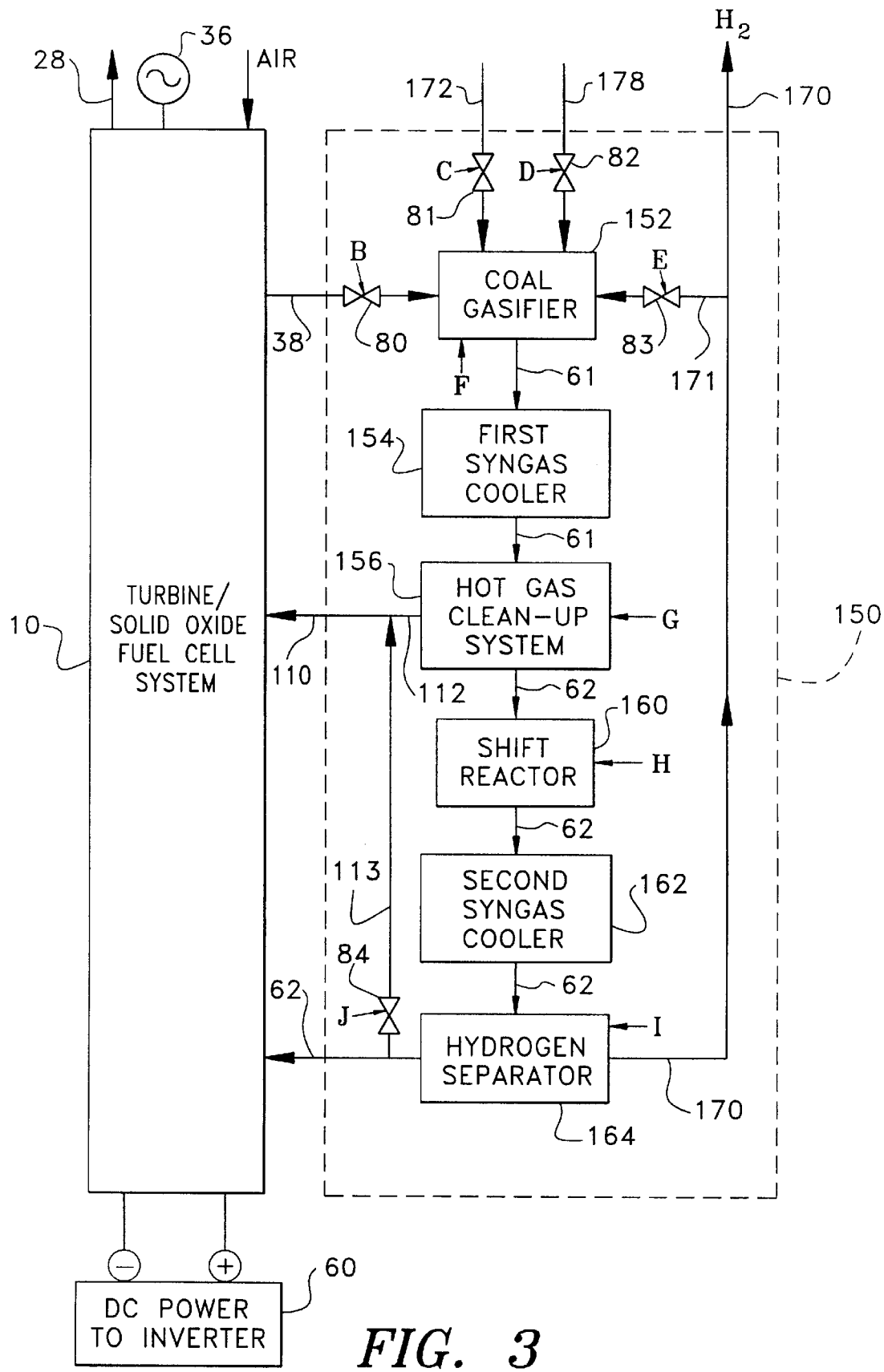
FIG. 3 is a schematic diagram of the syngas/hydrogen co-production system that produces fuel and low sulfur syngas for the turbine/solid oxide fuel cell system and co-produces hydrogen.

Now referring to FIG. 3, the turbine/solid oxide fuel cell system 10 is integrated with the syngas/hydrogen co-production system 150 that comprises a coal gasifier 152, a first syngas cooler 154, a hot gas clean-up system 156, a shift reactor 160, a second syngas cooler 162, and a hydrogen separator 164. A purpose of the system 150 is to produce fuel 110 for the topping combustor 70. Another purpose of the system 150 is to generate low sulfur syngas 62 from coal. A further purpose of system 150 is to co-produce hydrogen 170 when it is economically advantageous, whether for combustion of the hydrogen, fertilizer, or other purposes. The system 150 in other embodiments of the invention may have fewer or greater purposes, but the all will make hydrogen and generate some form of fuel or syngas from coal.

In an embodiment of the invention, the coal gasifier 152 receives the compressed air flow 38, a coal feed 172, a steam feed 178, and a hydrogen flow 171 to produce an uncleaned syngas flow 61. Coal gasification to produce uncleaned syngas 61 is a relatively old art. Literally dozens of different coal gasifiers have been designed, operated, and are described in the literature, as disclosed in U.S. Pat. No. 4,312,638 to Koump entitled "Coal Gasification Process," herein incorporated by reference in its entirety. Basically, the coal gasifier adds steam to the carbon of the coal. The overall reaction for the production of syngas in the coal gasifier is:

where the CnHm comes from the coal, the $O_2$ comes from the compressed air, the $H_2O$ comes from the steam and the reaction. When hydrogen is added to the left side of the reaction, the additional reaction of:

$$H_2+CO_2 \rightarrow H_2O+CO$$

occurs which adds steam to the system. The addition of hydrogen reduces energy costs because less water needs to be boiled to produce steam for the reaction. Other reactions occurring in the coal gasifier include nitrogen in the coal combining with hydrogen to form ammonia and sulfur in the coal combining with hydrogen to form hydrogen sulfide.

The input of the compressed air flow 38, coal feed 172, a steam feed 178, and hydrogen flow 171 to the coal gasifier 152 is controlled by control valves 80–83, respectively. The control valves 80–83 are directed by outputs B–E of the electricity/hydrogen production control means 42. Further, the operation of the coal gasifier is directed by output F of control means 42. In this manner, the amount and composition of the uncleaned syngas produced is controlled to meet the electricity generating and the hydrogen co-production requirements. Other embodiments of the invention may not introduce hydrogen into the coal gasifier 152.

The uncleaned syngas flow 61 is then directed through a first syngas cooler 154 and into the hot gas clean-up system ("HGCS") 156. The hot gas clean-up system of the preferred embodiment of the invention is disclosed in U.S. Pat. No. 5,540,896 to Newby entitled "System and Method for Cleaning Hot Fuel Gas," but other suitable systems may be used in other embodiments of the invention. The HGCS 156 of the preferred embodiment does not tolerate temperatures above 1600F. However, the uncleaned syngas flow 61 exiting the coal gasifier 152 is above 1600F., and is normally between 1800F. and 2400F. Therefore, the uncleaned syngas flow 61 is cooled to below 1600F. prior to entering the HGCS 156. Any suitable device for cooling the uncleaned syngas to below 1600F. is appropriate. Other embodiments of the invention may have a HGCS that tolerates high temperature gas, thereby eliminating the need for the first syngas cooler.

The HGCS 156 cleans the uncleaned syngas flow 61 to produce a low sulfur syngas flow 62 by removing the particulates, the sulfur, and alkali species therefrom. The levels to which the HGCS 156 must clean the uncleaned syngas depends upon the requirements of the shift reactor 160, the hydrogen separator 164, the topping combustor 70, and the SOFC 50. In the preferred embodiment of the invention, the uncleaned syngas 62 is cleaned to less than 1 ppm sulfur.

The HGCS 156 also produces an at least partially cleaned syngas flow 112 from the uncleaned syngas 61 from one or more locations within the HGCS. The at least partially cleaned syngas flow 112 is at least a portion of the fuel flow 110 for the topping combustor 70. By producing the flow 112 from one or more locations within the HGCS, the amount of cleaning performed is reduced, thus decreasing the cost of the flow 112 and, as a result, the fuel 110. The operation of the HGCS 156 is directed by output G of the control means 42 to send either more fuel to the topping combustor, thus increasing the electricity generated, or more low-sulfur syngas to the hydrogen separator 164, for increasing the hydrogen produced (described below) or increasing the amount of electricity generated by the SOFC 50.

The low sulfur syngas flow 62 is then directed to the shift reactor 160. The shift reactor 160 may break down the longer chain hydrocarbons to methane to maximize the percentage of methane, may shift the equilibrium of the constituents of the flow to maximize the percentage of hydrogen based on the desired hydrogen output of the embodiment, or attain some goal therebetween. The percentage of methane and/or hydrogen produced by the shift reactor 160 is controlled by output H of the control means 42. The shift reactor is commercially available item offered by Haldor Topsoe, Inc., 17629-T El Camino Real, Suite 302, Houston Tex. 77058. Other embodiments of the invention may have other suitable shift reactors or not have a shift reactor. The presence of a shift reactor may depend upon the requirements of the SOFC 50 in some embodiments of the invention.

In the embodiment of the invention shown in FIG. 3, the low sulfur syngas flow 62 is next directed to a second syngas cooler 162 to adjust the flow temperature into a range appropriate for the hydrogen separator 164. Any suitable device for adjusting the temperature of the flow is appropriate. In the preferred embodiment of the invention, the low sulfur syngas flow 62 is cooled to 1000F.–1200F. The low sulfur syngas flow 62 is then directed into the hydrogen separator 164. Other embodiments of the invention may not require the second syngas cooler 162.

The hydrogen separator 164 removes at least a portion of the hydrogen from the low sulfur syngas flow 62 to form a hydrogen flow 170. Suitable hydrogen separators are disclosed in U.S. Pat. No. 5,139,541 to Edlund entitled "Hydrogen-Permeable Composite Metal Membrane," U.S. Pat. No. 5,217,506 to Edlund et al. entitled "Hydrogen-Permeable Composite Metal Membrane and Uses Thereof," U.S. Pat. No. 5,259,870 to Edlund entitled "Hydrogen-Permeable Composite Metal Membrane," U.S. Pat. No. 5,393,325 to Edlund entitled "Composite Hydrogen Separation Metal Membrane," U.S. Pat. No. 5,451,386 to Collins et al. entitled "Hydrogen-Selective Membrane," and U.S. Pat. No. 5,498,278 to Edlund entitled "Composite Hydrogen Separation Element and Module," each of which is incorporated by reference herein in its entirety. The hydrogen flow 170 exits the syngas/hydrogen co-production system 150 as co-produced hydrogen. A portion of the hydrogen flow 170 may be recirculated into the coal gasifier as hydrogen flow 171 for the production of uncleaned syngas. The amount of the hydrogen recirculated, or if any is recirculated at all, is controlled by the output E of the control means 42 through control valve 83. The hydrogen separator 164 is constructed with a by-pass such that a portion or all of the low sulfur syngas flow 62 may by-pass the hydrogen separator depending of the electricity generation and hydrogen co-production requirements. The volume of the low sulfur syngas flow 62 by-passed is controlled by the output I of the control means 42.

After exiting the hydrogen separator 164, the low sulfur syngas flow 62 is directed to the SOFC 50 in the turbine/SOFC system 10. Some embodiments of the invention may require the syngas 62 to be heated prior to entering the SOFC 50. A low sulfur syngas flow 113, which is a portion of the low sulfur gas flow 62, may be combined with the at least partially cleaned syngas flow 112 and directed to the topping combustor 70 as fuel 110. The volume of the flow 113 coming off of the low sulfur syngas flow 62 is directed by the control means 42 through output J controlling the control valve 84 in the flow 113. The at least partially cleaned syngas flow 112 contains syngas that has not been processed as much as the second portion 113, and, therefore, is cheaper than syngas in flow 113. However, the syngas in flow 113 may be cleaner and have a higher energy value, which might result in better emissions from the topper combustor 70. Other embodiments of the invention may have the fuel flow 110 comprised entirely of flow 113 from the hydrogen separator.

By having the ability to co-produce hydrogen and to vary the production of hydrogen and the generation of electricity to economically advantageous levels, the invention provides a economical source of power from coal and produces a hydrogen stream. Accordingly, the present invention may be embodied in other specific forms without departing from the spirit or essential attributes thereof and, accordingly, reference should be made to the appended claims, rather than to the foregoing specification, as indicating the scope of the invention.

I claim:

1. A system for generating electricity and co-producing hydrogen comprising:
   a. electricity generating means, including a turbine-solid oxide fuel cell system a turbine compressor having a turbine and an associated compressor, and an associated topping combustor, for generating electricity and for producing a gasifier compressed air flow from the turbine compressor where the turbine is connected to an electrical generator, and where air inducted into the turbine compressor from a feed air inlet provides the gasifier compressed air flow;
   b. coal gasifier means connected to receive said gasifier compressed air flow from the turbine compressor for producing a gaseous uncleaned syngas flow from coal, steam, and the compressed air flow; and
   c. gaseous hydrogen co-production means for processing said gaseous uncleaned syngas flow to co-produce a gaseous hydrogen flow and for delivering a gaseous processed syngas flow to said electricity generating means, where the gaseous hydrogen co-production means comprises: (1) hot gas clean-up means for removing sulfur from said uncleaned syngas flow and for delivering a gaseous fuel stream to the topping combustor and providing a gaseous processed syngas flow, and (2) a hydrogen gas separation means for receiving and removing hydrogen gas from the processed syngas flow, and for delivering gaseous processed syngas flow, with a portion of hydrogen gas removed, to the solid oxide fuel cell system.

2. The system of claim 1, further comprising electricity/hydrogen production control means connected to said coal gasifier means and hydrogen co-production means for varying the amount of electricity generated and the volume of said hydrogen flow co-produced.

3. The system of claim 1, wherein the
   solid oxide fuel cell system receives a compressed air flow and at least a portion of said gaseous processed syngas flow and generates a first portion of electricity and a vitiated air flow; and
   topping combustor receives a fuel flow and said vitiated air flow and generates a second portion of electricity.

4. The system of claim 1, wherein said hydrogen co-production means further comprises fuel flow delivery means for delivering as the gaseous fuel stream at least a portion of said processed syngas flow to said topping combustor, where the topping combustor also receives a vitiated air flow from the solid oxide fuel cell system and delivers combustion products flow to the turbine and where said hot gas clean up means also removes particulates, and alkali species from said uncleaned syngas flow, and gasifier compressed air flow is provided directly from the turbine compressor, air is directly inducted into the turbine compressor and coal gasifier means is directly connected to receive gasifier compressed air flow.

5. The system of claim 2, wherein:
   said electricity/hydrogen production control means varies the amounts of said processed syngas flow and said gaseous fuel stream delivered to said topping combustor.

6. The system of claim 3, wherein:
   a. said turbine produces an exhaust air flow; and
   b. said electricity generating means further comprises a heating means for heating said gasifier compressed air flow with said exhaust air flow.

7. The system of claim 1, wherein said hydrogen co-production means further comprises shift reactor means.

8. The system of claim 1, further comprising hydrogen delivery means for delivering at least a portion of said hydrogen flow to said coal gasifier means.

* * * * *